ated June 20, 1916.
UNITED STATES PATENT OFFICE.

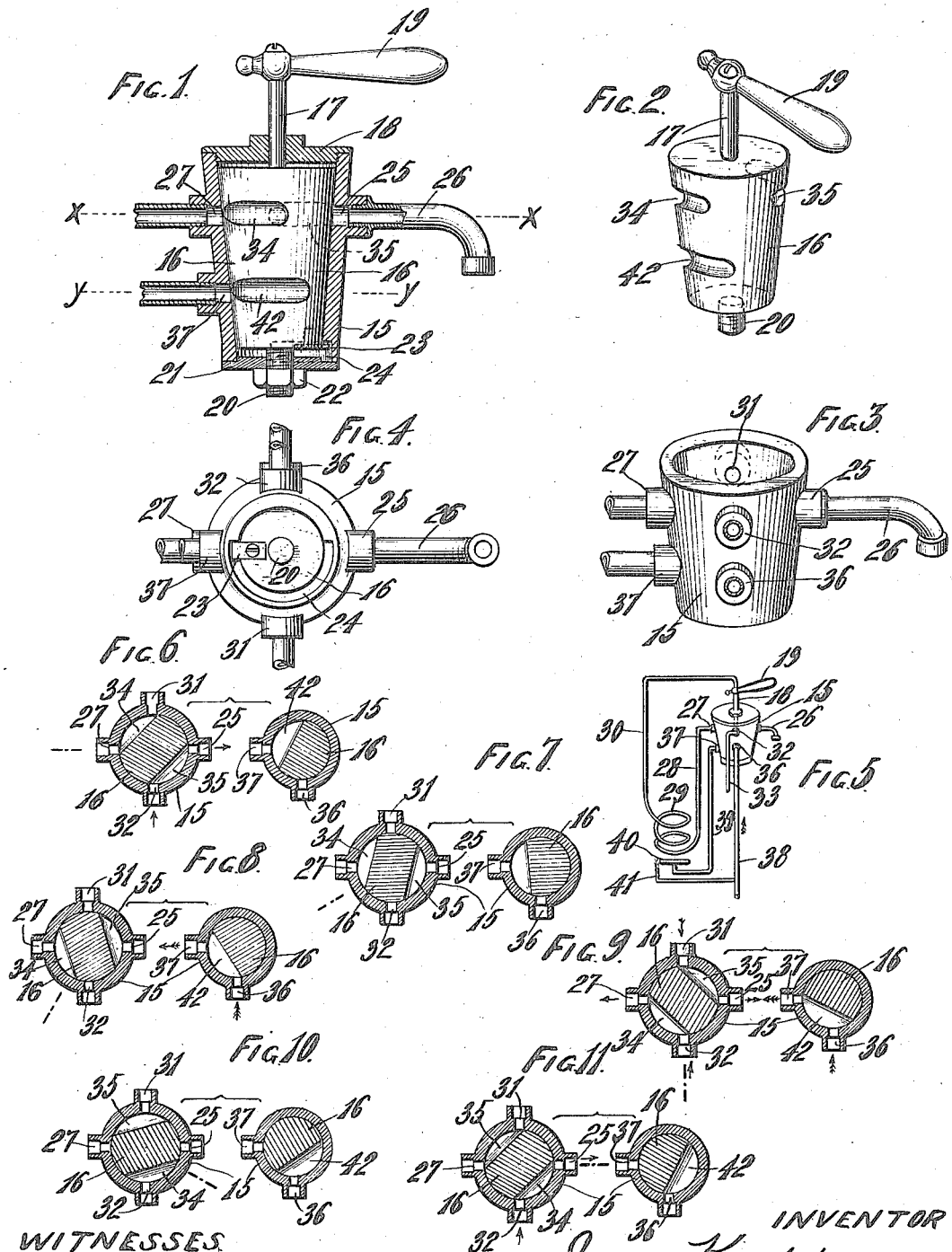

JAMES KRUPP, OF MILWAUKEE, WISCONSIN.

VALVE FOR WATER-HEATERS.

1,188,085.    Specification of Letters Patent.    Patented June 20, 1916.

Application filed March 22, 1915. Serial No. 16,309.

*To all whom it may concern:*

Be it known that I, JAMES KRUPP, a citizen of the United States, and resident of Milwaukee, in the county of Milwaukee and State of Wisconsin, have invented new and useful Improvements in Valves for Water-Heaters, of which the following is a description, reference being had to the accompanying drawings, which are a part of this specification.

This invention has for its object to provide a valve for controlling the flow of gas to a water heater, and the flow of water to and from the water heater so as to obtain instantaneous water heating without the usual danger of improper operation of an automatic valve.

Another object of the invention is to perfect details of construction in a valve for water heaters as herein claimed, and all equivalents.

With the above and other objects in view the invention consists in the valve for water heaters as herein claimed and all equivalents.

Referring to the accompanying drawings, in which like characters of reference indicate the same parts in the different views: Figure 1 is a sectional elevation of a valve constructed in accordance with this invention; Fig. 2 is a perspective view of the valve member; Fig. 3 is similar view of the valve casing; Fig. 4 is a bottom view of the valve with the bottom plate removed; Fig. 5 is a perspective view of the valve showing in diagram the pipe connections therewith; Fig. 6 is a double sectional view on the plane of section lines X—X and Y—Y of Fig. 1, showing the gas and water valve conditions in the first position of the valve in which cold water is caused to run; Fig. 7 is a similar view thereof in the second position of the valve after the handle has been moved approximately 30° and the valve is in a closed position; Fig. 8 is a similar view showing the third position of the valve with the gas connection established for heating the water in the coil, but without a flow of water; Fig. 9 is a similar view showing the fourth position of the valve with the gas connection still open, and the connection established for admitting cold water to the water coil and hot water from the water coil to the faucet, this being the position of the valve for drawing hot water therefrom; Fig. 10 is a similar view showing the fifth position of the valve in which both the water and gas connections are closed, this being another off position of the valve; and, Fig. 11 is a similar view showing the sixth position of the valve in which the gas connection is still closed but the cold water connection is established for drawing cold water from the faucet, this being substantially the same condition as that shown in Fig. 6, but the valve member being in diametrically opposite position.

In these drawings 15 indicates a valve casing which is preferably conical in shape and has a valve member 16 fitting therein with a stem portion 17 passing through the threaded disk 18 forming the closure for the larger end of the casing, there being a handle 19 on the end of the stem by which the valve member is turned, and serving to indicate by its position the various valve conditions. At its lower end the valve member has a screw stud 20 projecting through a flanged plate 21 forming the closure for the smaller end of the casing, and a nut 22 threaded on the stud 20 serves to draw the tapering valve member 16 into snug fit with the correspondingly tapered walls of the valve casing. The valve member 16 also has let into its lower end a stop lug 23 which projects beyond the valve member and travels in an arc-shaped groove 24 in the wall of the casing, thus limiting the movements of the valve by its engagement with the ends of said groove. The valve and valve casing have two valve areas, one above the other, the upper valve area being for the control of water and the lower valve area for the control of gas. In each of the Figs. 6 to 11 inclusive, both valve areas are shown.

In the upper valve area the valve casing has four pipe connections arranged 90° apart, the front pipe connection 25 communicating with a faucet or outlet pipe 26 through which the water is delivered to the basin or bathtub or the like. Diametrically opposite the pipe connection 25 is a pipe connection 27 for connection with a pipe 28 leading to a water heating coil 29 which may be located in the basement of the building, or wherever desired, the return pipe 30 from said coil connecting with a pipe connection 31 for delivering the hot water to the valve. Diametrically opposite the pipe connection 31 is a pipe connection 32 having connection with a cold water supply pipe 33. The valve member 16 is provided with two opposite grooves or passageways 34 and 35, each extending approximately 90° around the valve member, or a sufficient distance to connect together the ports or openings of adjacent pipe connections.

In the lower valve area the casing 15 has two pipe connections 36 and 37 approximately 90° apart, and connected respectively with gas supply pipe 38 and gas burner pipe 39 leading to a gas burner 40 which has a pilot burner 41 connected with the gas supply pipe 48. The valve member 16 has a groove or passageway 42 extending over somewhat more than 90° of the valve member and adapted to connect the ports or openings of the gas connections 36 and 37 for admitting gas to the burner.

In the first position of the valve, shown in Fig. 6, which is one of the extreme positions thereof, the passageway 35 connects the cold water supply pipe connection 32 with the faucet connection 26 so that cold water is discharged through the faucet. A slight turn of the valve from this position, or a turn of approximately 30° brings the valve to the position shown in Fig. 7, in which there is no communication between ports, this being one of the off positions of the valve. A further turn of approximately 30° brings the valve to the position shown in Fig. 8, in which there is no water connection between the ports, but the gas ports 36 and 37 are connected by the passageway 42 and gas is therefore delivered to the burner 40 to start the heating of the water in the coil 29, such gas being ignited from the pilot burner 41. This connection should be only temporary and as soon as water is heated the valve should be further moved to its next position, shown in Fig. 9, in which the passageway 34 connects pipe connections 32 and 27 together to admit cold water from the water supply pipe 33 to the pipe 28 leading to the water heating coil, and passageway 35 connects pipe connections 31 and 25 together to admit the hot water from pipe 30 to the faucet 26. In this connection of the valve the passageway 42 continues to connect the gas ports 36 and 37 and the water is heated as fast as it is discharged. By moving the valve to the position shown in Fig. 10 both the water ports and the gas ports are closed so that the valve is again in an off position, and if from this position it is moved to the position shown in Fig. 11, cold water is caused to run from the faucet by the pipe connections 32 and 25 being connected by the passageway 34. Thus the valve for convenience has two off positions and two cold water positions, besides having a heating position, in which the water is heated without running, and a hot water position, in which the water is heated and is discharged at the same time.

By means of this invention the remote control of the gas supply to the burner may be had without resorting to automatic valves commonly used with instantaneous heaters. There is a danger in the use of automatic valves for this purpose, as it sometimes happens that the supply of gas to the burner is not shut off when the flow of water is closed, and the burner thus continues in operation indefinitely to not only involve an unnecessary expense through the waste of gas, but increasing the danger of fire. With this valve the control of gas being performed by the same valve member which controls the water there can be no failure of the gas valve to operate properly, and the condition of the gas burner is indicated by the position of the valve handle. Furthermore, by means of this valve the same faucet may be used for drawing hot or cold water.

Obviously many changes may be made in the details of construction of the valve as shown and described without departing from the spirit and scope of the invention.

What I claim as new and desire to secure by Letters Patent is:

A valve for water heaters, comprising a valve casing having four uniformly spaced pipe connections at one transverse valve area thereof for communicating respectively with a water supply pipe, a pipe leading to a water heater, a pipe leading from a water heater, and a water discharge pipe, and also having pipe connections at another transverse valve area for connection with a gas supply pipe and the burner pipe of the water heater, a valve member fitting within the valve casing and having opposite passageways in the first mentioned valve area for respectively connecting the water supply pipe connection with the pipe connection leading to the water heater and the pipe connection leading from the water heater with the pipe connection of the water discharge pipe, said valve member also having a passageway in the other valve area adapted to connect the pipe connections of the gas supply pipe and the water heater burner pipe at the same time that the said connections are made in the first mentioned valve area and also in some positions of the valve in which the said connections are not made, the passageways of the valve in the first valve area being also adapted in other positions of the valve to connect the water supply pipe connection with the discharge pipe connection.

In testimony whereof, I affix my signature, in presence of two witnesses.

JAMES KRUPP.

Witnesses:
R. S. C. CALDWELL,
KATHERINE HOLT.